United States Patent [19]

Halbach

[11] Patent Number: 4,767,684
[45] Date of Patent: Aug. 30, 1988

[54] METHOD OF CHARGEABILITY IMPROVEMENT AND REDUCED CORROSION FOR SODIUM-SULFUR CELLS

[75] Inventor: Carl R. Halbach, Costa Mesa, Calif.

[73] Assignee: Ford Motor Company, Dearborn, Mich.

[21] Appl. No.: 87,265

[22] Filed: Aug. 19, 1987

[51] Int. Cl.$^4$ .................................... H01M 10/39
[52] U.S. Cl. .............................. 429/103; 429/104
[58] Field of Search .................... 429/104, 102, 103

[56] References Cited

U.S. PATENT DOCUMENTS

| | | | |
|---|---|---|---|
| 3,404,035 | 10/1968 | Kummer et al. | 429/104 X |
| 3,404,036 | 10/1968 | Kummer et al. | 429/104 X |
| 3,413,150 | 11/1968 | Kummer et al. | 429/104 X |
| 3,446,677 | 5/1969 | Tennenhouse | 429/193 |
| 3,458,356 | 7/1969 | Kummer et al. | 429/104 X |
| 3,468,709 | 9/1969 | Kummer | 429/104 |
| 3,468,719 | 9/1969 | Tennenhouse | 429/191 |
| 3,475,220 | 10/1969 | Knorr | 429/104 |
| 3,475,223 | 10/1969 | Kummer et al. | 429/13 |
| 3,475,225 | 10/1969 | Tennenhouse | 429/193 |
| 3,535,163 | 10/1970 | Dzieciuch et al. | 429/104 |
| 3,719,531 | 3/1973 | Dzieciuch et al. | 429/193 X |
| 3,811,943 | 5/1974 | Minck et al. | 429/104 |
| 3,951,689 | 4/1976 | Ludwig | 429/27 |
| 3,966,492 | 6/1976 | Ludwig | 429/102 |
| 3,976,503 | 8/1976 | Minck et al. | 429/104 X |
| 3,980,496 | 9/1976 | Ludwig et al. | 429/103 |
| 4,002,806 | 1/1977 | Gupta et al. | 429/104 |
| 4,002,807 | 1/1977 | Ludwig | 429/104 |
| 4,024,321 | 5/1977 | Tilley | 429/104 |
| 4,084,041 | 4/1978 | Ludwig | 429/104 |
| 4,084,042 | 4/1978 | Ludwig | 429/104 |
| 4,189,532 | 2/1980 | Golz | 429/215 |

OTHER PUBLICATIONS

Ford Aerospace & Communications Corp., Aeronutronic Div. Newport Beach, CA., *Proposal for Na/8 Space Call Development*, vol. III, Supporting Technical Info. (Proposal No. 29709), Jul. 2, 1985.

*Primary Examiner*—Anthony Skapars
*Attorney, Agent, or Firm*—Lorraine S. Melotik; Roger L. May

[57] ABSTRACT

This invention relates to a method for improving the chargeability of sodium-sulfur cells by including in the cathodic reaction of the cell a device which provides a continuous release of additive into the sodium polysulfide/sulfur cathodic reactant. This method also reduces the corrosion of corrodible metal current collectors which may be employed in contact with the cathodic reactant therein.

7 Claims, 5 Drawing Sheets

FIG.5A
CONSTANT RATE

FIG.6A

FIG.5B
ACCELERATED INITIAL RATE

FIG.6B

FIG.5C
EXPONENTIALLY INCREASING RATE

FIG.6C

FIG.5D
EXPONENTIALLY DECREASING RATE

METHOD OF CHARGEABILITY IMPROVEMENT AND REDUCED CORROSION FOR SODIUM-SULFUR CELLS

TECHNICAL FIELD

This invention relates to alkali metal-sulfur cells. More particularly, this invention relates to a method for improving the chargeability of sodium-sulfur cells by providing a continuous and controlled rate of release of additive into the sodium polysulfide/sulfur cathodic reactant. This method also reduces the corrosion of corrodible metal current collectors which may be employed in contact with the cathodic reactant therein.

BACKGROUND OF THE INVENTION

A recently developed type of secondary battery or rechargeable electrical conversion cell comprises: (1) an anodic reaction zone containing a molten alkali metal anode-reactant, e.g., sodium, in electrical contact with an external circuit; (2) a cathodic reaction zone containing a cathodic reactant comprising a molten liquid electrolyte, e.g., sulfur or a mixture of sulfur and a molten polysulfide, which is electrochemically reversibly reactive with the anodic reactant; (3) a solid electrolyte which functions as a cation-permeable barrier to mass liquid transfer interposed between and in contact with the anodic and cathodic reaction zones; and (4) a current collector at least one region of which is exposed to the cathodic reactant. The current collector is in electrical contact with both the cation-permeable barrier and the external circuit. As used herein the term "reactant" is intended to mean both reactants and reaction products. Hereinafter, for simplicity, this type of secondary battery or rechargeable electrical conversion cell will be referred to as a cell.

During the discharge cycle of such a cell, molten elemental alkali metal, such as sodium, surrenders electrons to an external circuit and the resulting alkali metal cations pass through the solid electrolyte. The electrons, having passed through the external circuit to the current collector, react with the liquid electrolyte, e.g., sulfur, on the surface of the current collector to form sulfide and/or polysulfide ions. Because the ionic conductivity of the liquid electrolyte is less than the electronic conductivity of the current collector, it is desirable during discharge that both the electrons and the sulfur be applied to and distributed along the surface of the current collector in the vicinity of the cation-permeable solid electrolyte. When the sulfur and electrons are so supplied, polysulfide ions can be formed near the solid electrolyte so as to be available to combine with alkali metal cations passing out of the solid electrolyte and form alkali metal polysulfide.

During the charge cycle of such a cell, when a negative potential larger than the open circuit cell voltage is applied to the anode, the opposite process occurs. Thus electrons are removed from the alkali metal polysulfide by charge transfer at the surface of the cathode current collector and are conducted through the external circuit to the anode. The alkali metal cations formed in the cathode are conducted through the liquid electrolyte and solid electrolyte to the anode where they accept the electrons from the external circuit. Because of the aforementioned relative conductivities of the ionic and electronic phases, this charging process occurs preferentially in the vicinity of the solid electrolyte and leaves behind molten elemental sulfur.

The cathode current collector of a sodium-sulfur cell as described herein includes a porous electrode generally of carbon or graphite felt in contact with a solid cathode current collector. The porous electrode may totally or partially fill the cathodic reaction zone. The solid cathode current collector may comprise a material such as a metal, graphite or a conductive glass or ceramic. It may be merely a current collecting terminal or may also serve as a container to hold the catholyte. While both the porous material and the solid cathode current collector serve to collect current in the cathode, the porous material is generally referred to as the porous electrode or cathode electrode and the solid electrode is generally referred to as the cathode current collector or, simply, the current collector. Use of the term current collector herein is meant to encompass reference to the porous electrode and/or the solid cathode current collector. If reference is intended to only the porous electrode or the solid cathode current collector, it will be called such.

As can be readily appreciated, the production of large amounts of sulfur near the surface of the solid electrolyte has a limiting effect on rechargeability. This is the case since sulfur is nonconducting and, when it covers the surfaces of the porous electrode and/or solid electrolyte, charge transfer is inhibited and consequently the charge process is greatly hindered or terminated. Thus, in order to improve the rechargeability of a cell of this type, it was believed necessary to not only supply polysulfide to the surface of the porous electrode in the vicinity of the solid electrolyte, but also to remove sulfur therefrom.

U.S. Pat. Nos. 3,811,493 and 3,980,496 both disclose Na-S cell designs which allow or promote improved mass transportation of reactants and reaction products to and from the vicinity of the solid electrolyte and the porous electrode, during both charge and discharge of the cell. For example, the improvement disclosed in U.S. Pat. No. 3,980,496 comprises designing the cathodic reaction zone of the device such that there are a plurality of channels and/or spaces within said zone which are free of porous electrode material and which are thus adapted to allow free flow of the molten cathodic reactants during operation of the device.

U.S. Pat. No. 3,976,503 discloses an improved method for recharging Na-S cells which involves maintaining a temperature gradient within the cathodic reaction zone during recharging such that the temperature of the cathodic reactants in a first region adjacent the solid electrolyte or cation-permeable barrier is sufficiently higher than the temperature of said reactants in a second region not adjacent the barrier, such that sulfur in the first region vaporizes and is transported to said second region where it condenses.

U.S. Pat. No. 3,966,493 discloses an improved cell of the type described above which exhibits increased ampere-hour capacity as the result of an improvement which comprises: (1) employing a porous conductive material which will wick both sulfur and alkali metal polysulfides and which, in different regions of the cathodic reaction zone, exhibits different degrees of wettability by said alkali metal polysulfides, the material in a region adjacent to the cation-permeable barrier being more readily wetted by the polysulfides than is the material in a region further removed from the barrier such that sulfur will boil near said barrier and condense away from it; (2) disposing the porous conductive material within the cathodic reaction zone such that it forms and encloses one of more channels which extend from the region adjacent the cation-permeable barrier outwardly into the region of the cathodic reaction zone which is further removed from the barrier; and (3) maintaining the amount of molten cathodic reactant within the cathodic reaction zone such that said channels remain free of the molten reactant and are thus adapted to transport sulfur vapor.

The devices of U.S. Pat. Nos. 3,966,492 and 3,951,689 each employ electrode materials which are preferentially wet by polysulfide salts. These patents also teach the use of such a material in conjunction with an electrode material which is preferentially wet by sulfur.

U.S. Pat. Nos. 4,084,041 and 4,084,042 are directed to Na-S cells which are taught to have increased ampere-hour capacity. The improvement of the cells comprises employing an electrode, at least a portion of which consists of a porous conductive substrate which (1) is coated, at least in part, with particularly defined materials which render the electrode portion more readily wettable by molten polysulfide than by molten sulfur, (2) does not fill the entire region of the cathodic reaction zone, and (3) is, at least in part, adjacent to and continuous with the solid electrolyte.

It was also customary to prepare a cell of this type without regard to the presence of corrodible materials or other impurities, particularly in the presence of the cathodic reactants. Thus, the cell container may have been made of metal, e.g., stainless steel, and the porous electrode may have been formed of metal, e.g., a stainless steel felt. Although such cells demonstrate excellent chargeability characteristics initially, they tend to show decreased capacity with each successive cycle. An examination of such prior art cells that have deteriorated in their charge/discharge capacity to the point of failure has shown that the shortened cycle life and deterioration of charge/discharge capacity of these cells might be attributed, at least in part, to the corrosion of the metal container or electrode, the accumulation of metal corrosion products on the solid electrolyte surface, the accumulation of corrosion products within the porous electrode and decreased mobility of sodium polysulfide within the porous electrode as a result of such corrosion product accumulation. In order to solve the problems of decreased cycle life and deteriorating charge/discharge capacity, it has been proposed to exclude metal or metal compound corrosion products from the cathodic reaction zone by forming the cathodic container and electrode from conductive, non-metallic materials, which are inherently non-corroding. An exception to this proposed exclusion of metals is the metal molybdenum, since it is substantially non-corroding in the sulfur-polysulfide catholyte. Preparing cells or batteries free of metals or metal compounds other than molybdenum was described to result in a significant increase of charge/discharge cycle life and a stabilization of charge/discharge capacity. However, such cells, including those with molybdenum current collectors, after initial discharge, do not recharge to the extent that those cells containing corrodible metal impurities do.

U.S. Pat. No. 4,002,806 teaches that the lack of ampere-hour capacity found in metal-free or non-corroding cells of the type described can be overcome. It taught that this could be accomplished by including certain additives: particulate metals, metal salts, and other metal compounds in the cathodic reactant. It is further taught therein that by including such additives in the cathodic reactant, such non-corroding cells retain long cycle life and stabilized capacity. The mechanism by which these additive materials increase ampere-hour capacity of the device is not known. One of several theories mentioned in the patent is that the materials may to an extent coat the graphite felt, thereby rendering it preferentially wettable by polysulfide and, thus, increasing charge efficiency. Such a mechanism, as stated therein, is only one of several possibilities, and is not certain. It is just as likely that, when these materials are dissolved in or mixed with polysulfide melt, they impart general or localized electronic conductivity to the melt, thereby extending the effective electrode area, altering the electrode kinetics and improving charge capacity. In that patent, however, unlike in the invention disclosed herein, the additive is incorporated in the cathodic reactant when the cell is assembled in a form whereby the entire amount of additive is immediately available to the cathodic reactants, i.e., for reaction therewith. However, we have found that doing so causes the additive to be "used up" in relatively few charge/discharge cycles. This is because during operation of the cell, the additive reacts with (i.e., is corroded by) the cathodic reactants, namely sulfur and sodium polysulfides, to form products which have low solubilities in the cathodic reactant. These corrosion products tend to migrate by diffusion and convection to regions within the cathode space electrochemically favorable to deposition. In this manner, such otherwise favorable corrosion products are depleted after the cell has been cycled a number of times, far short of the potential number of cycles of which the cell is capable. A larger amount of additive oould be initially incorporated into the cell in an attempt to provide additive which would be available for a greater number of cycles of the cell. However, such large amounts of additive would, if added in an available form as in the patent described above, have an adverse effect on the life of the cell in a relatively short time. This is because such a large initial amount of additive would: (1) consume a larger amount of the cathodic reactants making a portion of the cathode reactant unavailable for reversible electrochemical reaction: (2) form corrosion products which would extensively contaminate the solid electrolyte surface, thereby increasing its resistance to cation permeability and increasing thermal-mechanical stresses within the solid electrolyte; and (3) deposit substantial amounts of corrosion product solids within the porous cathode electrode reducing both exposed surface area as well as porous paths necessary for cathode reactant convection. Overall, the availability of the entire amount of additive at the start of the cell's operation results in increased electrochemical polarization and ohmic losses as well as the depletion of the additive in a relatively few charge/discharge cycles, resulting in loss of capacity and efficiency. Additionally, the life-time potential of the cell is further reduced by the increased stresses on the solid electrolyte caused by the impurity products. Thus, when the entire additive is available and released "in bulk" at the beginning of the cells' operation, it has deleterious effects on the extended performance of the cell. Such is the case in the invention disclosed in U.S. Pat. No. 4,002,806 wherein the additive is controlled as to kind and total amount but the additives availability to the cathode process is not controlled.

One object of this invention is to provide efficient two-phase chargeability of sodium-sulfur cells over the potential lifetime of such cells. These cells may utilize (1) substantially non-corroding cathode materials (i.e., materials which are substantially non-corroding when contacted by the cathodic reactant) such as molybdenum, graphite or carbon, conductive glass, or conductive ceramic materials or (2) slowly corroding cathode materials such as chromium plate, diffused chrome, or steel with a high chromium content.

It is another object of this invention, i.e., in addition to providing efficient two-phase chargeability, to substantially reduce the corrosion rate of cathode materials such as chromium plate which corrode slowly during the operation of standard alkaline metal-sulfur cells.

I have found that the chargeability of a Na-S battery or cell can be improved for its entire potential lifetime by providing metal or metal compound additives in a form which causes the additive not to be released all at once but rather to be released at a controlled rate and substantially continuously into the cathodic reactant during operation of the cell, preferably for the potential lifetime of the cell. I have also found that such continuous and controlled release of selected additives effectively provides protection against corrosion of cathode current collectors made of corrodible metals such as chromium or chromium steels.

BRIEF DESCRIPTION OF THE INVENTION

The aforementioned objects are achieved in accordance with the improvement of this invention by including in the cathodic reaction zone of a alkali metal-sulfur cell a device which provides a continuous release of a metal or metal compound additive in an amount between about 0.01 and about 100 ppm/cycle of operation thereof, based on the initial weight of the cathodic reactant. More particularly, the device provides a continuous release of certain metals, alloys comprising such metals, certain salts of such metals, oxides, phosphides, arsenides, antimonides, carbides and nitrides of such metals or mixtures thereof into the cathodic reactant of the cell in a controlled amount during each cycle of operation of the cell. The device may provide the additive in an amount which varies from cycle to cycle of cell operation as long as it is within about 0.01 and about 100 ppm/cycle, based on the initial weight of the cathodic reactant.

Advantageously, this invention thus permits cells to be fabricated of more corrosion-resistant materials to reduce impurity accumulation within the porous cathode electrode, which cells at the same time have improved charge/discharge capacity during their potential cycle life, i.e., this invention provides efficient two-phase chargeability of sodium-sulfur cells. While reducing impurity accumulation can be accomplished by the use of graphite, glass, ceramic or molybdenum cathodic structural components, for example, in place of corrodible metallic components, usually the consequent result is a significant reduction in the chargeability of the cell into the two-phase (sulfur and polysulfide mixture) region. It is believed that such good two-phase chargeability is established according to the improvement of this invention by providing additives, in a continuous manner, which corrode in the presence of the cathodic reactant and are converted to sulfides or other sulfur containing compounds. These corrosion products, it is further believed, affect the wettability of the porous electrode material by sulfur and polysulfide and/or modify the localized electronic conductivity of the cathode reactant melt. However, neither the validity nor the understanding of this theory is necessary for the practice of the improvement of the present invention.

Additionally this invention advantageously improves the lifetime of cells with slowly corroding cathode current collector materials, namely, those described above, by reducing the corrosion rate of such materials. This increases the potential lifetime of the cell from the point of view of maintaining the physical integrity of the cathode current collector material, which is particularly important when the current collector also serves as the cell container. One explanation for the reduced corrosion rate is that the continuous release of a suitable additive modifies the structure of a metal sulfide film formed on the slowly corroding current collector material during operation of Na-S cells. Such modified metal sulfide film may substantially prevent further corrosion of the current collector material under the sulfide film. Another possible explanation for the reduced corrosion of slowly corroding cathode materials in the Na-S cells employing the device disclosed herein is that the controlled additive release provides a more favorable reactant composition distribution within the porous electrode which results in reduced current collector potential gradients. The exact process is complicated and not fully understood. While these explanations are advanced to explain the ability of the continuous and controlled release of additive according to the invention disclosed herein to slow the corrosion rate of slowly corroding current collector materials, neither its accuracy nor its understanding is necessary for operation of the present invention.

DETAILED DESCRIPTION OF THE INVENTION

The secondary or rechargeable electrical conversion cells to which the improvement of this invention applies are disclosed in the following United States patents, the disclosures of which are herein incorporated by reference: U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531; 3,811,493; 4,002,806; 4,024,321; 4,084,041.

As mentioned above, the secondary electrical conversion cells to which the improvement of this invention applies comprise generally: (1) an anodic reaction zone containing a molten alkali metal reactant-anode in electrical contact with an external circuit; (2) a cathodic reaction zone containing a cathodic reactant comprising a molten liquid electrolyte comprising sulfur or a mixture of sulfur and sulfur saturated polysulfide of the molten alkali metal reactant which is electrochemically reversibly reactive with the anodic reactant; (3) a solid electrolyte comprising a cation-permeable barrier to mass liquid transfer interposed between and in contact with the anodic and cathodic reaction zones; and (4) an electrode of porous conductive material which is at least partially immersed in the cathodic reactant, the porous conductive material being in electrical contact with both the solid electrolyte and the external circuit.

The anodic reactant employed in such cells is an alkali metal which is maintained above its melting point when the cell is in operation. The anodic reactant is heated by any conventional means including, not by way of limitation, Joule heating, induction heating, and heat exchange with a suitable fluid. The anodic reactant may also be viewed as the anode proper or conductor through which the electron flow to the external circuit is achieved. A cell component of this type is conventionally referred to in the art as a sacrificial electrode in that while it is serving the role of a conductor, it is also undergoing electrochemical reaction. Molten sodium is employed as the anodic reactant in most preferred embodiments of such cells. However, potassium, lithium, or other alkali metals, mixtures of such alkali metals, or alloys containing such alkali metals can be used.

The cathodic reactant is a molten material which is electrochemically reversibly reactive with the anodic reactant. Generally, and in preferred embodiments of such cells, the cathodic reactant is sulfur or polysulfides of the anodic reactant. As the device begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated alkali metal polysulfide in which the molar ratio of sulfur to alkali metal is about 5.2:2. When the device is discharged to the point where the mole fraction of sulfur is about 0.72, the cathodic reactant becomes one phase in nature since all elemental sulfur has formed polysulfide salts. As the cell is discharged further, the cathodic reactant remains one phase in nature and as the mole fraction of sulfur drops so does the open circuit voltage corresponding to the change in the potential determining reaction. Thus, the cell continues to discharge from a point where polysulfide salts contain sulfur and alkali metal in a molar ratio of approximately 5.2:2 to the point where polysulfide salts contain sulfur and alkali metal in a ratio of about 3:2. At his point the cell is considered to be fully discharged.

On recharging the reverse of the above occurs. Theoretically the cell should recharge to the point where nearly all polysulfide is converted to sulfur. However, such efficiency is not achieved even under the best circumstances. Many of the non-corroding metal and metal compound free cells discussed above do not charge past the single phase region of the sulfur/polysulfide and do not exhibit the charge/discharge capacity desired. Even those which do recharge into the two phase sulfur saturated polysulfide region do not recharge as far into that 2-phase region as would be desirable. As the cell is charged or discharged, the relative concentrations of sulfur and alkali metal thus vary considerably.

The secondary cells to which the improvement of the invention is applicable may have a number of different configurations, several of which are disclosed in the above-incorporated patents. Several configurations are particularly preferred.

The design disclosed in the U.S. Pat. No. 4,084,041 incorporating a sodium anode within a tubular solid electrolyte, is referred to as a "sodium-core" or "central-sodium" type of cell. The solid cathode current collector in this cell generally serves as the catholyte container as well as the negative current collecting terminal. A second type of preferred configuration comprises a design disclosed in U.S. Pat. No. 4,024,321. The design disclosed therein is referred to as a "sulfur-core" or "central-sulfur" type of cell. This cell functions electrochemically in the same way as the sodium-core type of cell except for the reversed positions of the sodium and sulfur reactants with respect to the solid electrolyte. The solid cathode current collector in this cell serves only as a negative current collecting terminal. Either cell type can incorporate cathode electrodes of porous conductive material having open volume paths to promote free flow, or more conventionally, not have such open spaces.

The anodic reactant (e.g., sodium) is separated from the cathodic reactant (e.g., sulfur) by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant during operation of the device. The cathodic reactant together with the separator provides a sufficient barrier to free electron flow in the internal portion of the electrical circuit to permit a difference of potential to develop at the respective electrodes of the cells in operation. It is preferred that the separator be as thin as possible without unduly sacrificing strength. Such cation permeable barriers are well known to those skilled in the art. Exemplary of suitable cation permeable barriers are those disclosed in the above incorporated patents, e.g., glass and polycrystalline ceramic materials,"beta"-alumina being a particularly preferred embodiment of the latter.

The cathodic porous electrode is in electrical contact with both the solid electrolyte and the external circuit, the latter contact generally being via a solid cathode current collector. Preferably, the porous electrode is also in physical contact with both the solid electrolyte and the solid cathode current collector, which in the case of a sodium-core cell, is generally the container in which the electrical conversion cell is housed. The porous electrode is of significantly greater surface area than a solid cathode and may comprise any porous material which is electronically conductive and which is resistant to attack by reactants within the cathodic reaction zone. Among the materials which are generally employed are felts, cloth or foams of carbon, graphite or vitreous carbons.

IMPROVEMENT OF THE INVENTION

The improvement of this invention involves incorporating a device within the cathodic reaction zone, preferably within a porous electrode therein to give the device support, which provides a continuous and controlled release of additive material selected from those generally described in U.S. Pat. No. 4,002,806. The additives useful in the improvement of this invention may be selected from:

i. metals selected from the group consisting of (a) metals from Groups I, II and III of the Periodic Table of Elements, (b) Transition Series Metals, and (c) antimony, lead, tin and bismuth;
ii. alloys comprising the metals of (i);
iii. salts of the metals of (i);
iv. oxides of the metals of (i);
v. phosphides, arsenides, antimonides, carbides and nitrides of the metals of (i); and
vi. mixtures of any of (i) through (v). Exemplary of the above described metals which may be particularly useful as the additive are aluminum, chromium, iron, nickel and mixtures of any of them. The metal salts useful in this invention may be selected from salts including halides, nitrates, nitrites, thiocyanates, sulphates, sulfides (or polysulfides), hydroxides and any mixture thereof.

In U.S. Pat. No. 4,002,806, hereafter referred to as the "previous patent", the additive is simply included as is, preferably in particulate form, in the cathodic reactant when the cell is assembled and hence is available in its entirety at the beginning of cell operation. As discussed above, the entire additive is immediately available to be reduced to sulfides or sulfur containing compounds, to be dissolved in the cathode reactant, and then to be transported and deposited at electrochemically and thermally compatible locations. This results in excessively early and rapid depletion (i.e., within a small fraction of the cell's potential cycle life) of the additive followed by the contamination of the cathode-side surface of the solid electrolyte. Thus, the invention of the previous patent does improve the capacity, efficiency and cycle life of cells, but does not generally yield the full potential of these performance variables.

The improvement of this invention does, in contrast to the invention of the previous patent, yield the full potential performance (capacity, efficiency and lifetime) of cells by regulating the release of the cathode additive. The improvement of this invention comprises increasing the charge/discharge capacity of the alkali metal-sulfur cell over the potential cycle life thereof by including in the cathodic reaction zone a device which provides a continuous release of the above defined additive in an amount between about 0.01 and about 100 ppm/cycle of operation of the cell, preferably in an amount between about 0.1 and about 1 ppm/cycle of operation of the cell, based on the initial weight of the cathodic reactant. A cycle of operation of the battery or cell is meant to include one charge and one discharge cycle. The amount in ppm of additive released by the device per cycle of operation of the cell is defined as (the weight of the the additive/initial weight of the cathodic reactant)$\times 10^6$. As is discussed in detail hereinafter, the device of this invention can be adjusted to provide an initial release of a threshold amount of additive followed by a regulated continuous release of additive to sustain good chargeability over the potential lifetime of the cell. As will be described in detail hereinafter, the device may be designed so as to provide a release of different amounts of additive during different cycles of operation of the cell.

The device of this invention is capable of providing, during the total cycles of operation of the cell, a release of tens of thousands of ppm of additive, however, less than 10,000 ppm is considered adequate. Na-S cells are generally designed to operate for at least 1000 cycles of operation, preferably for at least about 2000 cycles for commercial application (electric vehicles and stationary energy storage). For military and satellite applications, lifetimes in excess of 10,000 cycles are being considered. As was discussed above, without the improvement of this invention, however, such cells do not operate at their potential capacity or efficiency or for their potential lifetime.

Ideally, according to the improvement of the invention disclosed herein, the device is capable of providing a release of a minimum amount of additive during the potential cycle life of the cell. Preferably, the cell would be sized to provide a release of at least about 1000 ppm additive during the potential cycle life of the cell. Selection of the release schedule and maximum amounts of additive the device would provide over the cycle life of the cell would depend, e.g., on the potential number of cycles through which the cell would reasonably be expected to operate, the ppm/cycle of additive to be released by the device, the cell or battery operating conditions such as temperature, and cycling conditions such as depth of discharge, charging cut-off voltage and duty cycle (charge/discharge/idle time). For example, when the cell's solid cathode current collector is made of a non-corroding (non-metal) material or substantially non-corroding molybdenum metal, the device would preferably be sized to provide a release of additive in an amount between about 1000 ppm and 5000 ppm additive during the lifetime of the cell. On the other hand, if the solid cathode current collector is made of chromium plated material, the device of this invention might be sized to provide a release of the same amount or possibly a lesser amount of additive since some chromium sulfide would also be formed from some of the chromium of the collector which invariably would be corroded. (Chromium sulfide is a suitable additive as defined in this invention.) It has been observed, however, that when additives are supplied according to this invention in cells employing chrome plated materials as the solid cathode current collector, especially when the solid current collector also is the container, the corrosion rates of the chromium current collectors are significantly reduced, thus increasing the potential life of the cell from the point of view of allowable current collector corrosion. Selection of the optimal amounts of additive to be dispensed per cycle of the cell employing different types of current collectors will be apparent to those skilled in the art in view of the present disclosure.

Since, the improvement of this invention comprises a device which provides a continuous and controlled release of the additive into the cathodic reactant, in effect, the device substantially controls the rate of production of a corrosion product (formed by reaction of the additive with the sulfur/polysulfides). In the case of a metal additive, the corrosion product is a sulfide of the metal additive. For example, 1.0 ppm of chromium metal (Cr) can form about 1.9 ppm of chromium sulfide ($Cr_2S_3$). For non-metallic additives, such as oxides or nitrides of the metal, the corrosion product is a sulfur containing compound, e.g., a metal sulfate. Corrosion of a single additive in a Na-S cell is not expected to produce only one compound as a corrosion product; rather, the chemistry is complex leading to many compounds which may be present simultaneously with proportions changing during cycling of the cell. For instance, the following sulfides will most likely be present in a cell containing a molybdenum current collector when a device according to this invention is employed to release a chromium-iron alloy additive:

1. Simple sulfides: $FeS$, $FeS_2$, $Cr_2S_3$ and $Cr_2S_5$.
2. Complex sulfides: $Na_3FeS_3$, and $NaCrS_2$.

These are normally found in addition to the molybdenum sulfides and many sodium polysulfides. It is these sulfide reaction products which are useful for achieving good chargeability and/or reduced corrosion rate of cathode current collector surfaces over the entire potential cycle life of the cell.

Using a metallic additive as an example, it is believed that the metal is only useful to effect good two-phase chargeability of the cell when a portion of it has been reduced to a sulfide and has been dissolved into the cathode reactant. The latter dissolution amount is limited by solubility limits of the metal as sulfide in the cathode reactant. This solubility depends on the temperature of the cathode and on the composition of the catholyte. Reduction of metals to their sulfides is rapid, being most rapid for metallic additives introduced as small particles or powder, and slower, but still too rapid for more massive configurations such as wire, rods or sheet. Although the solubility of typical additives is very low, e.g., 165 micrograms/gram as $FeS$ for iron and 71 micrograms/gram as $Cr_2S_3$ for chromium at 375° C. in sodium pentasulfide, they are sufficient to deplete the readily reduced metallic additives in a small fraction of the potential cyclic lifetime of the cell.

Figure 1:
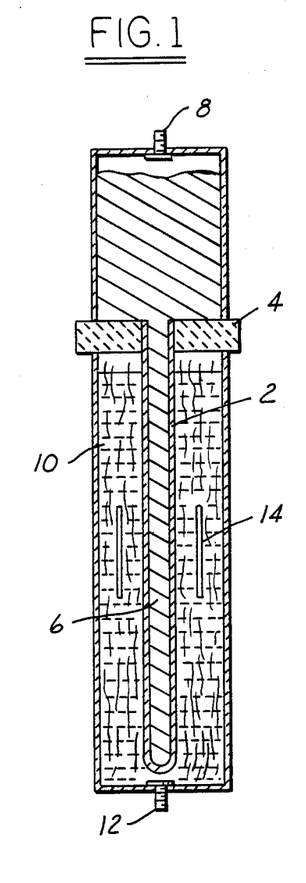
FIG. 1 is a vertical sectional view of a typical cell of the so-called "sodium-core" or "central sodium" type which includes an embodiment of the device of the improvement of this invention.
Figure 2:
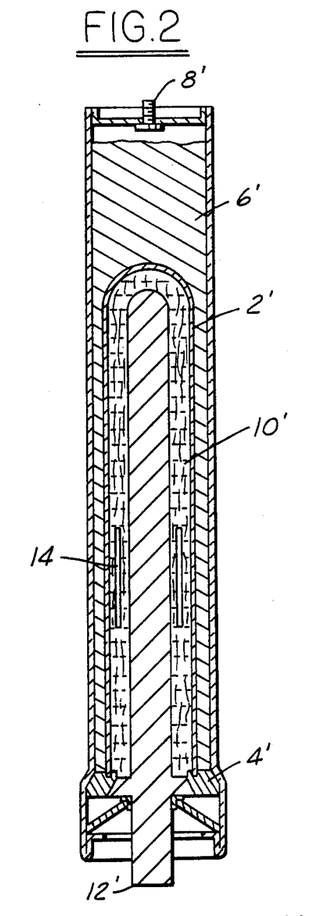
FIG. 2 is a vertical sectional view of a typical cell of the so-called "sulfur-core" or "central-sulfur" type which includes an embodiment of the device of the improvement of this invention.
Figure 3:
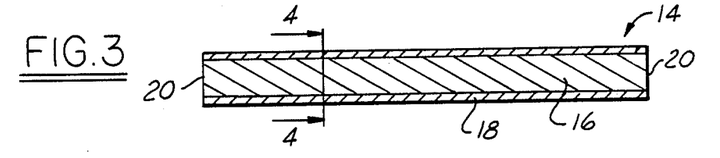
FIG. 3 is a vertical sectional view of an embodiment of the device of the improvement of this invention, termed herein the "coated wire" configuration.
Figure 4:
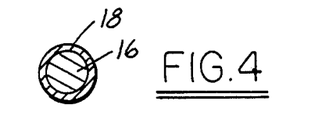
FIG. 4 is a cross-sectional view taken along line 4—4 of FIG. 3.

FIGS. 1 and 2 illustrate typical Na-S cells (sodium-core and sulfur-core, respectively) incorporating one embodiment of the device of the improvement of this invention which is detailed more explicitly in FIGS. 3 and 4. Four modifications of the device configuration of FIG. 3 are shown in FIGS. 5a–5d which illustrate means for varying the additive release rates to suit operational characteristics of battery systems. These modifications of the device are described in detail below.

The cells of FIGS. 1 and 2, respectively, include: (a) a tubular solid electrolyte 2 and 2', respectively, sealed to a nonconductive insulator such as alpha-alumina ceramic 4 and 4', respectively; (b) an alkali metal reactant anode (e.g., sodium) 6 and 6', respectively, electrically in contact with a metallic container-anode terminal 8 and 8', respectively; (c) a porous electrode such as graphite felt 10 and 10', respectively, immersed, when the cell is in the theoretically fully charged state, in molten sulfur in contact with a cathodic current collector-terminal 12 and 12', respectively; and (d) additive release devices 14. The invention improvement involves a device 14, one embodiment of which is shown more explicitly in FIGS. 3 and 4, which comprises a central body of additive material 16 surrounded by an inert material 18. FIG. 3 is a vertical sectional view and FIG. 4 is a cross-sectional view of the device of FIG. 3 along line 4—4 of FIG. 3. This embodiment of the device is hereinafter referred to as the "coated wire" configuration with the additive being considered the "wire" and the inert material being considered the "coating". To the extent that the part or material described is shown in each of the figures, it will be designated by the same numeral used to describe FIG. 3.

This coated wire configuration device, when placed within the cathodic reaction zone of a Na-S cell singly or in multiples, is subject to corrosion by means of the cathodic reactant at the exposed ends 20 during cell operation. Corrosion proceeds a short distance into the protective inert coating 18 to a point where swelling of the corrosion product cracks the inert coating allowing additional additive to be exposed and corroded. The process of corrosion of the additive is the release of the additive as a sulfide, for example, which gives the cell electrode the necessary wettability characteristic to charge into the two-phase region of a sulfur-polysulfide mixture. In order for the above process to occur and release the additive according to the coated wire device embodiment described above, the coating must be relatively inert and impervious to the cathode reactants and, necessarily, must be a brittle material. The inert coating may be electronically insulating or conductive. For example, the inert coating could be a porcelain enamel or relatively inert molybdenum metal (molybdenum corrodes very slowly in the cathodic reactant). Other materials such as aluminum and chromium, not generally considered inert, may be nearly so under some cell operating conditions, i.e., certain operating cell electropotentials. Thus such materials may be used as a coating when coupled with suitable additive materials like iron to make a continuous additive device according to this invention.

Using the coated wire configuration as an example of one embodiment of the device of this invention, the rate of release of additive is adjustable by means of the following variables: (a) corrosion rate of the "wire" material chosen; (b) diameter of the "wire"; (c) number of "wire" lengths used; (d) whether one or both ends of each "wire" length is exposed; (e) the tensile strength of the inert coating material; and (f) the thickness of the inert coating. As disclosed above, the coating material is considered inert in that it is not subject to corrosion in the presence of molten cathodic reactant to the point of exposing and permitting premature corrosion of the additive material at any place along the "wire" other than at those places not originally coated. In this way, regulation of the additive rates depends, e.g., in the case of the FIG. 3 configuration, on corrosion proceeding from the non-coated ends only.

Figures 5A, 6A:
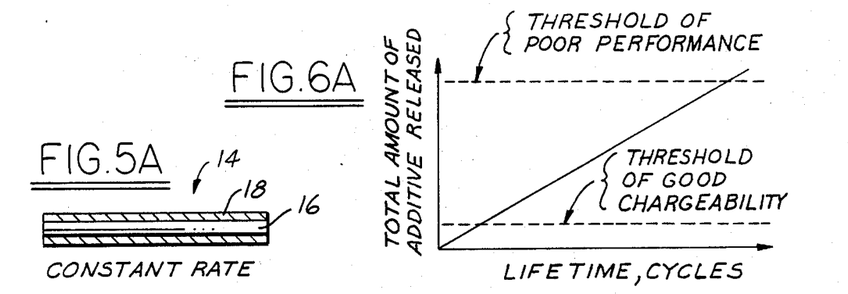
FIGS. 5a to 5d are vertical sectional views of four modifications of the coated wire configuration embodiment of the device of the improvement of this invention.
FIGS. 6a to 6d are graphical representations (not to scale) of the corresponding total additive released over cyclic lifetime of a cell according to the device embodiments of FIGS. 5a to 5d, respectively.

Four modifications of the FIG. 3 embodiment (i.e., the basic coated wire or cylindrical rod) are shown in FIGS. 5a to 5d. These four modifications (5a to 5d) demonstrate how the release rate of additive may be modified with a cell's cycle life. FIG. 5a shows the basic coated wire device embodiment with the inert coating 18 extending over the full length of the "wire" (additive). In this embodiment, the wire has a substantially uniform cross-sectional area. FIG. 6a is a graphical illustration showing total additive released as a function of the total number of cycles of the cell for a FIG. 6a device. The curve depicted in FIG. 5a shows a steady straight line accumulation of released additive as a function of cell lifetime or number of cycles.

Figures 5B, 6B:
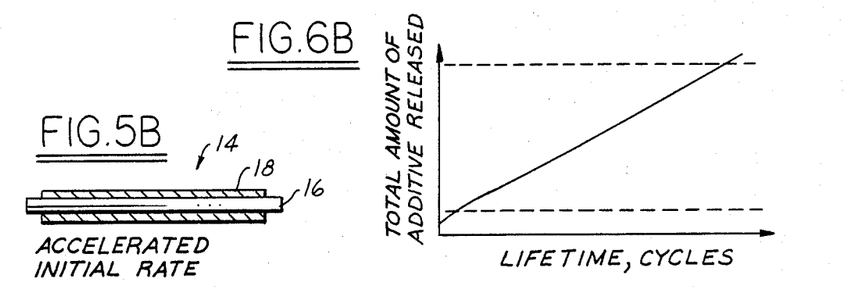

It is often desirable to achieve a required threshold amount of released additive to insure early life full chargeability. By coating only a portion of the length of the wire, e.g., by beginning with a variable amount of the wire exposed at one or both ends, as is the case with the modified coated wire configuration of the device shown in FIG. 5b, an initial accelerated release rate of additive is possible as shown in FIG. 6b. (FIG. 6b is a graphical illustration showing total additive released as a function of the total number of cycles of the cell for a FIG. 5b device.). Another way to provide an initial accelerated release of additive is to provide a discontinuous coating on the wire so as to provide a number of exposed portions of the wire over its length.

Figures 5C, 6C:
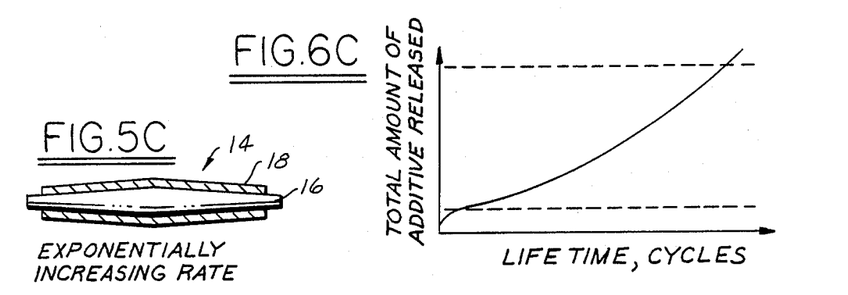
Figures 5D, 6D:
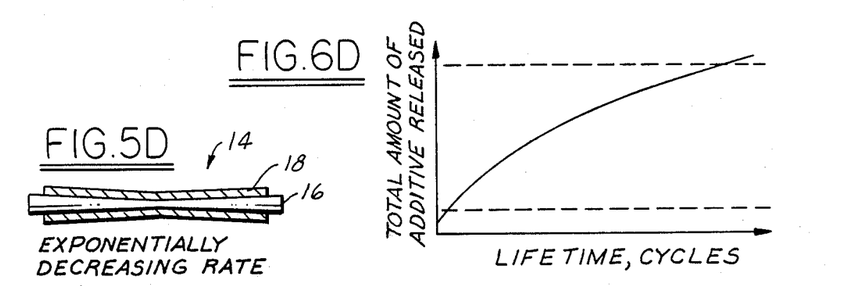

One could vary the cross-sectional area of the additive "wire" of the device with length as shown in FIGS. 5c and 5d to achieve an exponentially increasing or decreasing additive release rate as shown graphically in corresponding FIGS. 6c and 6d, respectively. (FIGS. 6c and 6d show the total additive released as a function of the total number of cycles of the cell for FIG. 5c and 5d devices, respectively.) Relative to cell requirements for the additive, the FIG. 5d configuration is considered more desirable than the FIG. 5c configuration because a portion of previously formed sulfide additives, for example, is continually being redissolved with each cell cycle. Therefore, using the FIG. 5c configuration device would release progressively less additive over the extended cycle life of the cell as indicated in the FIG. 6d curve. The concept of the FIG. 5b device which allows for an early initial additive release followed by a sustaining release can also be accomplished by combining the concept of the previous patent with the concept of FIG. 5a of this disclosure, namely provide a suitable amount of metal powder, for example, along with the Fiqure 5a configuration device. In general, however, the FIG. 5b configuration is adequate and more economically fabricated.

The decreasing release rate shown for the FIG. 5d configuration can be approximated by using a plurality of wires of varying length. An initial release rate would prevail with all wires corroding until the shortest wire was totally consumed; then the release rate would be reduced to a factor $(N-1)/N$ where N is the number of initial wires used. The curve of FIG. 6d would be approximated by N straight-line segments as each wire was progressively totally consumed.

In addition to the "coated wire" configuration device discussed above, other embodiments of the device of this invention for regulating the additive release rate are apparent to those skilled in the art in view of the present disclosure. For instance, a simple round disk can be used which is designed to corrode from the outer edge inward yielding a continuously reducing rate of corrosion product release. Or, conversely, the disk may be fashioned to corrode from the center outward with a continuously increasing corrosion rate. An example of the latter approach is exemplified below. Such suitable additive release devices, which may be similar or different from those disclosed herein, can be prepared in accordance with all prior art techniques and in any desired configuration as long as care is taken to control the rate of release of the additive within the cathodic reactant, throughout the operating life of the cell. As is also apparent from the disclosure herein, the device of this invention may include one embodiment of the device, e.g., the "coated wire" configuration, multiples of such wires which may be similar or different in shape, or the device may include different embodiments of the device, e.g., "wire" and "disc" configurations.

The invention will be further understood by referring to the following detailed examples. It should be understood that the specific examples are presented by way of illustration and not by way of limitation.

EXAMPLE I

To demonstrate how rapidly additive material is released without a rate controlling device, two tubular sodium-core cells were assembled with uncoated metallic additives. Both cells had theoretical (sulfur to sodium trisulfide) capacities of 192 Ah (344 grams of sulfur). The first cell, No. MKA01, had Kanthal A-1 (trademark, Kanthal Corp., Bethel, Conn.) alloy wires (5.5 Al+22 Cr +balance Fe) located in the cathodic reactant. The wire additive consisted of 8 wires, each 9.5 inches long and 0.0253 inches in diameter, equally spaced in the cathodic reactant with the wires oriented longitudinally, i.e., substantially parallel to the axis of the central sodium core. The second cell, No. LKX06, had ribbon strips of Raofoil RA-330 (trademark, Rolled Alloys Inc., Detroit, Mich.) alloy ribbon (35 Ni+19 Cr+2 Mn+1 1/4 Si+balance Fe). The ribbon additive consisted of 8 strips, each 9.5 inches long and having 0.002 inches thickness and ⅛ inch width, located in the cathodic reactant of the second cell.

The cell with the wire additive was operated for 201 cycles. Its performance was good for about 105 cycles after which time the performance was poor (low capacity, high resistance) with the cell exhibiting characteristics typical of excessive corrosion. Post-test inspection revealed that the wires, which had an initial total weight of 4.59 grams, were almost completely consumed, there being only 0.15 grams of wire remnants left. The amount of corrosion product produced in the cathodic reactant from 4.44 grams of additive (corresponding to about 12,900 ppm of metal additive) is about 26,000 ppm of metal sulfide. The actual amount of sulfide depends on the proportions of the specific sulfides formed. For purposes of discussion, a factor of 2 between sulfide formed and initial metal additive used gives a close approximation. The solid electrolyte surface was considerably darkened (dark gray and dark brown coloration) and contained many small $FeS_2$ crystals adhered to its surface. The cathode was clearly over-loaded with corrosion products from the wire additive, the wires being the only source of chromium and iron in the cell.

The second cell with the ribbon additive was operated for 282 cycles. It had good performance for about 230 cycles after which its performance was poor. Post-test inspection revealed that the ribbons, initially weighing a total of 2.3 grams, were totally consumed. The ribbons were converted to about 13,000 ppm of sulfide corrosion product.

Both of these cells had an inert protective coating on their solid cathode current collectors (which also served as the cell container). This coating consisted of a proprietary conductive glass coating on a steel substrate. These cells would normally revert* to early single-phase only performance but because of the additives, they charged well back into the two-phase region and had good performance until excessive amounts of corrosion products were formed. (*The term "revert"

used here requires an explanation. Conductive glass cells without a deliberate additive have sufficient trace impurities in their cathodes from handling in manufacture to cause normal full charging for a few cycles. These trace impurities are quickly consumed and the cell reverts to single-phase only charging.)

EXAMPLE II

This example illustrates the importance of using additives to achieve two-phase chargeability. Four other cells were tested from a group of identical cells of the type described in Example I. Two had no additive and two had iron sulfide, rather than metallic iron, added directly to the cathodic reactant in a manner proposed in the previous patent. The additive was not incorporated as part of a device which provided the slow release of the additive. Rather, the additives in these test cells were incorporated in the cathodic reactant of the cells as uncoated additives. Chargeability into the two-phase region of these four cells are compared with that of the Example I cells as follows:

| Cell No. | Additive Type | Additive Amount | Two-Phase Chargeability | Number of Good Performance Cycles |
| --- | --- | --- | --- | --- |
| LKX01 | None | — | No | 2 |
| LKX02 | None | — | No | 2 |
| LKX04 | FeS | 2,000 ppm | Yes | 500 |
| LKX05 | FeS | 250 ppm | Yes | 620 |
| LKX06 | RA-330 Alloy | 6,700 ppm | Yes | 230 |
| MKA01 | Kanthal A-1 Alloy | 12,900 ppm | Yes | 105 |

It should be pointed out that all six cells, with and without additives, charge well in the single-phase region of polysulfide only. Cells Nos. LKX04 and LKX05 delivered good performance longer than any of the other cells. It is clear from the data above that with an inert protective coating on the solid cathode current collector, some source of corrosion product or additive is necessary to obtain two-phase chargeability and the amount of such product needs to be limited. Clearly, adding the excessive amounts of additive in Cells Nos. LKX06 and MKA01 was detrimental to cell life while employing no additive, as in Cells Nos. LKX01 and LKX02, was far more detrimental. The moderate release of additive used in cells LKX04 and LKX05 gave the greatest benefit but the additive appeared to be consumed within 500-600 cycles. It also appears that the 250 ppm of FeS additive was more beneficial than the larger 2000 ppm amount, both being released suddenly. It should be pointed out that similar results would be expected had an amount of metallic Fe been used to yield the same FeS amounts.

From this and other testing, the optimal initial threshold amount of additive is estimated to be less than 100 ppm, very likely of the order of 10 ppm (additive to cathode sulfur weight ratio). In terms of the additive in metallic form, the lower threshold limit is estimated to be about 5 ppm.

Solubility of chromium sulfide and iron sulfide in sodium pentasulfide at 375° C. for example, is 90 and 220 ppm, respectively, referenced to the amount of sulfur (78%) in $Na_2S_5$. Solubility in sulfur itself is considerably less. Each time a cell is charged back into the two-phase region, the metal sulfides deposit with a tendency for permanent deposits to accumulate because solubility is not reversed totally during discharge. The build-up of deposits is harmful in that it can block convection within the porous electrode structure and can increase solid electrolyte resistance due to surface contamination. Cells have been seen to perform well for some large number of cycles, typically 50 to 150 cycles, and then revert to single-phase only charging. It appears that limited metal sulfide or other suitable additives are depleted as the result of preferential irreversible deposition within the cathode. Therefore, it is necessary to have both a continuous and controlled supply of additive.

EXAMPLE III

To demonstrate the slow release of metallic additive according to the improvement of this invention, two cells were fabricated with devices capable of providing a controlled release of additive. Each cell had three wires, each 0.0253 inches in diameter by about 1.2 inches long, of Kanthal A-1 (trademark, Kanthal Corp.) alloy (5.5 Al+22 Cr+balance Fe). The wires were coated with a nonconductive porcelain enamel which is inert in sulfur-polysulfide at cell operating temperatures to at least 400° C. The coating used was Solaramic Coating S5210-2C (trademark, Solar Turbines Inc., San Diego, Calif.). The enamel was applied as two coats, each fired at 1700° F., to yield an absolute seal over the wire surface. The coating on the ends of each length of wire was fractured to expose the wires much as in the embodiment depicted in FIG. 5a, i.e., without an excess amount of metal being exposed.

The two cells used were electric vehicle size cells with theoretical capacities of 48 Ah and of the type described in Example I. One cell, No. VSA01, was operated for 83 cycles and the other cell, No. VSA02, was operated 310 cycles. Both cells were cycled to deliver 80% of theoretical capacity (sulfur to sodium trisulfide) or 100% of rated capacity and delivered excellent performance for the period tested. The cells were voluntarily taken off test for the purpose of examining the degree of corrosion of the additive wires. These cells were dissected after testing, the wires were carefully removed and their post-test weight compared to pretest weights. Results of these tests are summarized as follows:

| Cell Number | Total Wire Length, inches | | Metal Weight Loss, grams | ppm Metal Released per Cycle |
| --- | --- | --- | --- | --- |
| | As Assembled | As Tested | | |
| VSA01 | 3.521 | 3.486 | 0.00208 | 0.29 |
| VSA02 | 3.772 | 3.603 | 0.01002 | 0.37 |

The difference in the values listed for ppm/cycle of metal relative to the cathode sulfur loading between the two cells is attributed to the better measurement resolution for cell No. VSA02. It operated for a greater length of time and a greater change in wire weight had occurred. From the six exposed ends of the three wires in the cell, it appears that from 0.35 to 0.40 ppm/cycle of metal or about 0.7 to 0.8 ppm/cycle of sulfide are released (based on the more accurate data for cell VSA02). Thus, for one exposed wire end according to the device embodiment employed, one would expect about 0.05 ppm of metal (equivalent to about 0.1 ppm of sulfide corrosion product)/cycle to be released.

Figure 7A:
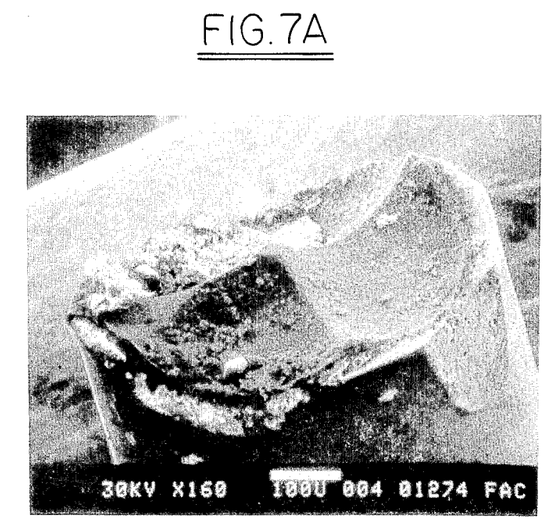
FIGS. 7a and 7b are photographs of the end of a porcelain enamel coated wire of the device type depicted in FIG. 3 and taken from a sodium-sulfur cell.
Figure 7B:
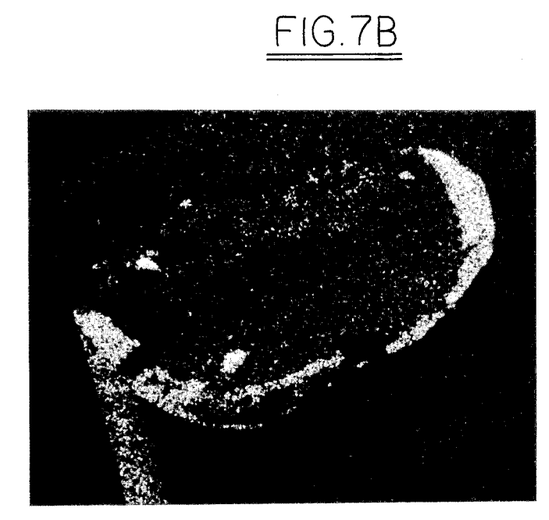

FIG. 7a shows a scanning electron microscope (SEM) photo of one end of one of the coated wires taken from cell No. VSA02. FIG. 7a shows that the corroded metal surface is "scalloped" as a result of the corrosion process. The surrounding enamel coating is seen to have a fractured edge corresponding in axial location to the exposed metal surface. FIG. 7b shows an SEM-EDAX (dispersive X-ray analysis) dot map for silicon revealing the location of the silica type-enamel fracture surface.

The bare wires in cell No. LKX06 of Example I demonstrated an equivalent sulfide release of the order of 129 ppm/cycle on the average (26,000 ppm/201 cycles). Probably the rate was initially higher, tapering off quickly to a lesser rate, like 200 initially and 100 ppm/cycle finally, for instance. For the purpose of simplicity in presenting an example of the FIG. 5b type of device, consider the 0.0253 inches in diameter wire used in Examples I and III and assume average sulfide equivalent additive release rates. Exposed wire would yield about 26,000/(8)(9.5) or 340 ppm/inch of length when totally consumed or 340/201 equal to about 1.7 ppm/inch per cycle. Then consider a single wire of the FIG. 5b type with one inch of bare wire exposed. The exposed portion would yield about 340 ppm of additive over about 200 cycles. The coated portion of the wire would then continue to supply additive at the rate of about 0.1 ppm/cycle for one end exposed or 0.2 ppm/cycle for both ends exposed. For a total of 5000 cycles, for instance, the additive release would amount to 340 ppm in the first 200 cycles and a total of 200+(4800)(0.1)(2) or 1160 ppm over the life of the cell with both ends of a single wire exposed. Had two wires with all ends exposed and a total of one-inch of bare wire been used, the release would amount to 340 ppm in the first 200 cycles and a total of 2120 ppm after 5000 cycles. Between the two sets of demonstration cells (Example I versus Example III), one can see that a coated wire or a multiple number of such wires with a portion of the ends exposed can give an initially high metal sulfide additive release followed by a very low sustaining level.

EXAMPLE IV

The cells of this example were sodium-core type cells having a cathode current collector/container surface of molybdenum. Several of these cells were tested which did not contain a cathodic additive and they experienced two-phase charging problems resulting in significantly reduced (50%) capacity. Another cell of this type, No. LEB02, was tested with another embodiment of a device of this invention included in the cathodic reactant which provided the slow controlled release of an iron-chromium metal alloy (26 Cr+Balance Fe). In this example the device comprised a flat, thin (0.010 inches) section of the alloy coated with molybdenum by chemical vapor deposition (CVD). A pinhole opening (approximately 100 microns in diameter) through the CVD coating provided an initial corrosion site to release iron-chromium (sulfides) into the cathodic reactant. After the first few cycles, the cell operated in single-phase only until the additive became available in sufficient quantity to promote two-phase chargeability. At cycle No. 23, the capacity recovered to its rated value and remained at near rated capacity over the test period of 684 cycles. Inspection of the device after the cell was dissected showed that the corrosion spot grew in a circle fracturing the CVD molybdenum coating progressively outward, releasing additive sulfide at an ever increasing rate. In 684 cycles, the corrosion spot had grown to a diameter of ¾ inches having produced about 4000 ppm of sulfide over the tested life of the cell.

Figure 8:
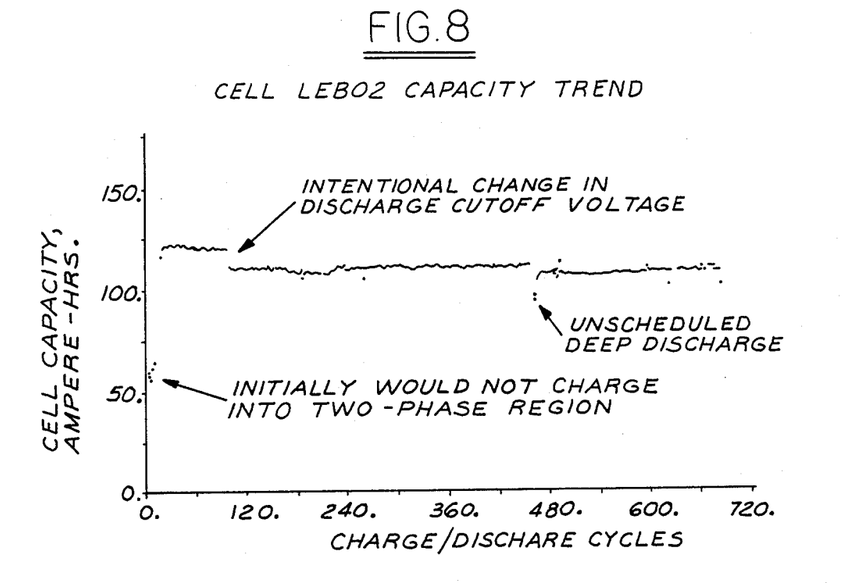
FIG. 8 is a graph which shows the variation of the ampere-hour capacity of a sodium-sulfur cell having a molybdenum current collector and a slow continuous release of additive over an extended number of charge/discharge cycles.
Figure 9:
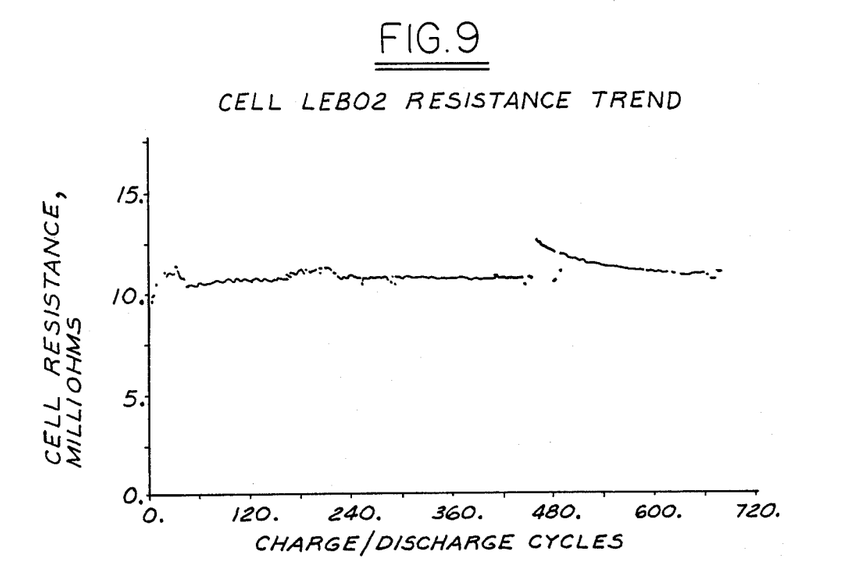
FIG. 9 is a graph which shows the variation of the cell resistance for the cell of FIG. 8.

FIG. 8 shows the ampere-hour capacity delivered by the CVD molybdenum cell LEB02 as a function of the charge/discharge cycles completed. Theoretical capacity based on sulfur to sodium trisulfide is 145 Ah for this cell. Under normal operating conditions, the cell is expected to deliver at least 100 Ah. A lack of early corrosion product or sulfide additive (the initial pinhole being too small) would explain the charging anomaly which occurred in the first 23 cycles. Thereafter, cell No. LEB02 was an excellent performer. At cycle No. 460, a control system malfunction resulted in the cell being deep discharged to 0.4 volts. Capacity shifted downward slightly (see FIG. 8) and gradually recovered. Recovery required about 150 cycles as best seen on the cell resistance plot of FIG. 9. The step down in capacity at cycle No. 100 resulted from an intentional change in discharge cutoff voltage from 1.75 to 1.80 volts. Cell No. LEB02 was voluntarily taken off of test after 684 cycles. FIGS. 8 and 9 demonstrate the excellent performance possible with a substantially non-corroding current collector (in this example, molybdenum) and the use of a controlled and sustained additive release. Had an initial release of additive of the order of from 10 to 100 ppm been incorporated, the brief single-phase only operation would have been avoided.

The experiment with cell No. LEB02 demonstrated a controlled release of additive with a device different than the more simple wire. In some applications a flat surface device may be more desirable than the wire embodiment. The wire concept is, however, considered the more economical configuration and offers more optimum additive release rates.

EXAMPLE V

This example displays the reduced corrosion of chromium-plated cathode current collectors which results from controlled additive release according to the improvement of this invention. In the course of developing and demonstrating the controlled additive release concept to improve chargeability in cells with essentially non-corroding cathode current collector surfaces, it was noted that such a device can reduce the corrosion rate in normally corroding cells. Specifically, current collectors protected by slowly corroding chromium plate, were found to corrode at a significantly reduced rate when another corrosion source, i.e., other than the chromium plate, is provided.

This phenomenon first became evident during post-test dissection of several dozen cells operated in excess of one year. No quantitative substantiation was documented. Rather, the observations of a qualitative nature revealed a significant trend. Cells in which significant chromium plate attack occurred had exposed aluminum metal at the cathode seal that was relatively unattacked. Conversely, cells in which the chromium plate was only mildly attacked had significantly corroded aluminum seal metal. It is believed that the different corrosion phenomenon witnessed in these cells resulted from differences in the electrical contact between the aluminum seal metal and the cathode porous electrode.

EXAMPLE VI

Figure 10:
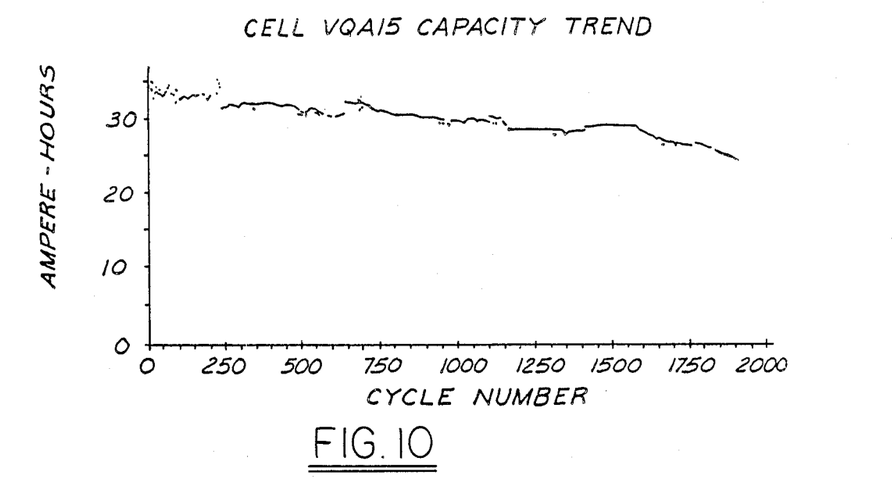
FIG. 10 is a graph which shows the variation of the ampere-hour capacity a sodium-sulfur cell operated over 2000 cycles having corrosion products protecting a chromium-cathode current collector.
Figure 11:
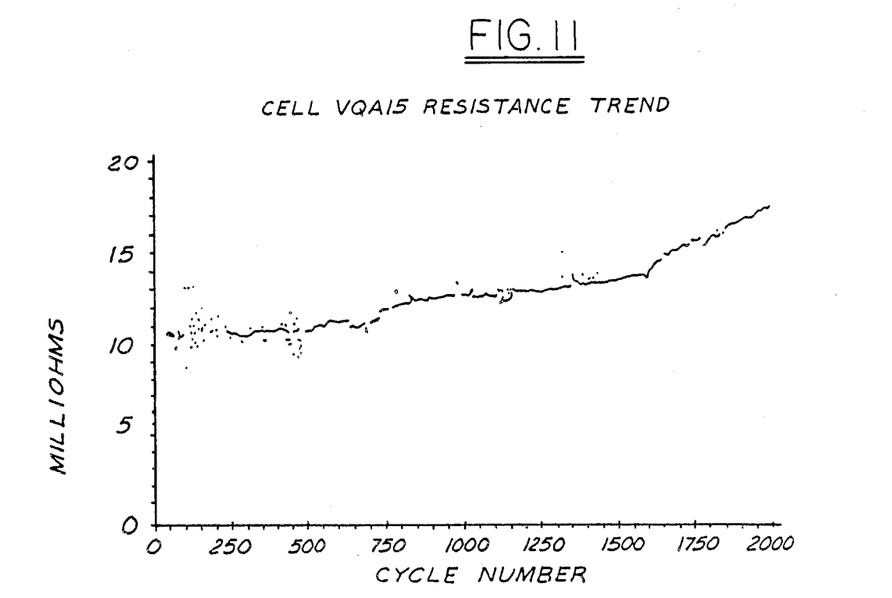
FIG. 11 is a graph which shows the variation of the cell resistance for the cell of FIG. 10.

This example is a more specific and dramatic display of the reduced corrosion that can be provided normally corroding materials in an operating Na-S cell when employing the improvement of this invention. Electric vehicle cell No. VQA15 of the sodium-core type operated over 2000 cycles with excellent performance. Upon dissection, the chromium plate in this cell was found to be attacked very little. The chromium plate had the appearance of that from a cell operated less than 500 cycles. A porcelain enamel-covered metal end closure for the cathode space, normally inert, was found to have corroded. The amount of metal corroded into sulfide exceeded 100,000 ppm relative to the amount of sulfur loaded into the cell. Most of the corrosion product remained at the corrosion site. The metal corroded was Type 410 stainless steel comprised essentially of about 12% chromium and 88% iron. Because of the location of the corrosion site the corrosion product tended to remain at the corrosion site and the cells cathode was not excessively contaminated by the corrosion product. Cell performance remained exceptionally good to over 1500 cycles as can be seen in the capacity and resistance data of FIGS. 10 and 11. With a more specific additive release device such as the coated wires described in this disclosure, good performance is expected to continue to an even greater number of cycles for this type of cell.

In this example, the corrosion product appears to have offered sacrificial protection to the chromium plate. The protection mechanism offered the Cr is not fully understood. Cathodic protection of Fe by Cr is also observed in sodium polysulfide catholytes. Therefore, it is suspected that Fe additive dopes the chromium sulfide formed on the chromium plate providing additional protection to the chromium plate by means of one or both of the following:

1. Improvement of electronic conductivity of the chromium sulfide thereby reducing the potential drop across the sulfide layer.
2. Formation of tighter (less porous) chromium sulfide crystal stacking, reducing the bulk diffusion of sodium polysulfide reactant to the chromium metal and transport of chromium ions away from the metal.

The concept of controlled additive release offers possible optimization of either of these mechanisms to promote longer life with a chromium-plated-metal corrosion protection system.

Regarding the apparent protection offered by the corrosion of aluminum seal metal observed in many of the cells, the above mechanisms may be involved. It can also be argued that this case simply involves cathodic protection of the chromium by the aluminum. Aluminum was found to be transported and concentrated at sites normally observed to have heavy corrosion resulting in aluminum sulfide deposits at these sites within the chromium sulfide corrosion layer. A beneficial effect in the form of either improved electronic conductivity or crystal formation is still suspected. While aluminum sulfide itself is not a good conductor, the aluminum may be forming other beneficial compounds with chromium, sodium and sulfur.

Thus, the controlled and sustained release afforded by the device of this invention is useful in sodium-sulfur cells in two respects:

1. To improve chargeability in cells which utilize cathode current collector surfaces of the non-corroding or substantially non-corroding (i.e., very slowly corroding) type.
2. To reduce the corrosion rate of cathode current collector surfaces which corrode slowly or at moderate rates.

The former advantage results from cathode electrode wettability changes as a result of the additive release, while the latter advantage involves direct modification of the solid cathode current collector corrosion film. The experiments detailed above in Examples V and VI have involved the use of the metals aluminum, chromium and iron and alloy combinations of these metals in contact with the cathodic reactant. Chromium and iron are excellent additives to achieve (1) above, while aluminum is found to be generally ineffective. In the case of (2) above, all three metals are found to be effective additives. Trace amounts of other elements and compounds are believed to be important for the optimization of both (1) and (2) above. It should also be pointed out that in cells which have poor two-phase chargeability, the chargeability can be improved by reducing the charging rate (current). Usually, however, these lowered charging rates are unacceptable for the intended cell/battery application. Or, in cases where the slow charging rate is tolerable, oftentimes intermittent cycles of poor chargeability will be experienced making the cell unreliable from a battery system point of view.

In view of this disclosure, many modifications of this invention will be apparent to those skilled in the art. It is intended that all such modifications which fall within the true scope of this invention be included within the terms of the appended claims.

I claim:

1. In a cell comprising:
   (A) one or more anodic reaction zones containing a molten alkali metal reactant-anode in electrical contact with an external circuit;
   (B) one or more cathodic reaction zones containing (a) a cathodic reactant comprising a liquid electrolyte selected from sulfur or a mixture of sulfur and sulfur saturated polysulfide of said molten alkali metal reactant which is electrochemically reversibly reactive with said anodic reactant and (b) an electrode of porous conductive material which is at least partially immersed in said cathodic reactant; and
   (C) a cation-permeable barrier to mass liquid transfer interposed between and in contact with said anodic and cathodic reaction zones, said porous conductive material being in electrical contact with both said cation-permeable barrier and the external circuit; the improvement comprising increasing the charge/discharge capacity of said cell by including in said cathodic reaction zone a device which provides a continuous release of an additive in an amount between about 0.01 and about 100 ppm/cycle of operation of said cell based on the initial weight of said cathodic reactant, and said additive being selected from:
   i. metals selected from the group consisting of (a) metals from Groups I, II and III of the Periodic Table of Elements, (b) Transition Series Metals, and (c) antimony, lead, tin and bismuth;
   ii. alloys comprising the metals of (i);
   iii. salts of the metals of (i);
   iv. oxides of the metals of (i);
   v. phosphides, arsenides, antimonides, carbides and nitrides of the metals of (i); and
   vi. mixtures of any of (i) through (v).

2. In the cell according to claim 1, wherein said device provides a release of an additive in an amount between about 0.1 and about 1 ppm/cycle of operation of said battery or cell.

3. In the cell according to claim 1, wherein said additive is selected from the group consisting essentially of aluminum, chromium, iron, nickel and a mixture of any of them.

4. In the cell according to claim 1, wherein said device is selected from: (1) a device comprising said additive being in the shape of wire having a substantially uniform cross-sectional area and having a coating along at least a portion of its length of a material which is substantially inert in the presence of molten cathodic reactant, (2) a device comprising said additive being in the shape of wire having a varying cross-sectional area and having a coating along at least a portion of its length of a material which is substantially inert in the presence of molten cathodic reactant, and (3) combinations of (1) and (2).

5. In the cell according to claim 4, wherein said coating is selected from the group consisting essentially of molybdenum, porcelain enamel, glass, ceramic, carbon or graphite.

6. In the cell according to claim 1, wherein said device is disposed within said porous electrode.

7. In the secondary battery or cell according to claim 1, wherein said alkali metal reactant is sodium and said cathodic reactant in the theoretically fully charged state consists of sulfur.

* * * * *

UNITED STATES PATENT AND TRADEMARK OFFICE
CERTIFICATE OF CORRECTION

PATENT NO. : 4,767,684

DATED : August 30, 1988

INVENTOR(S) : Carl R. Halbach

It is certified that error appears in the above-identified patent and that said Letters Patent is hereby corrected as shown below:

On the cover sheet, item [73] should read as shown:
--Ford Aerospace Corporation, Newport Beach, Calif.--

Signed and Sealed this

Fifteenth Day of August, 1989

Attest:

DONALD J. QUIGG

*Attesting Officer*

*Commissioner of Patents and Trademarks*